United States Patent
Milden

Patent Number: 5,539,994
Date of Patent: Jul. 30, 1996

[54] SCREW GUN AND TAPE MEASURE DEVICE

[76] Inventor: John W. Milden, 33 Rambo Ct., Linden, Va. 22642

[21] Appl. No.: 139,765

[22] Filed: Oct. 22, 1993

[51] Int. Cl.⁶ .................................................. G01B 3/10
[52] U.S. Cl. ............................... 33/760; 33/758; 33/761; 33/286
[58] Field of Search .................... 33/755, 759, 760, 33/761, 765, 768, 769, 770, 286, 758

[56] References Cited

U.S. PATENT DOCUMENTS

| | | | |
|---|---|---|---|
| 111,327 | 1/1871 | Dillingham | 33/760 X |
| 661,202 | 11/1900 | Wright | 33/760 |
| 3,021,599 | 2/1962 | Odom | 33/760 X |
| 3,255,531 | 6/1966 | Anderson | 33/765 |
| 3,756,635 | 9/1973 | Beers . | |

FOREIGN PATENT DOCUMENTS

| | | | |
|---|---|---|---|
| 0019744 | 8/1905 | Sweden | 33/760 |

*Primary Examiner*—Christopher W. Fulton

[57] ABSTRACT

A screw gun is typically employed in the mounting of plasterboard to building studs includes a tape housing having a central tubular opening directed coaxially thereof for mounting upon the screw gun member to permit ease of measuring among fasteners to be directed into the associated plasterboard member. The tape housing includes an extensible and retractable flexible tape member.

2 Claims, 3 Drawing Sheets

SCREW GUN AND TAPE MEASURE DEVICE

BACKGROUND OF THE INVENTION

1. Field of the Invention

The field of invention relates to tape measure devices, and more particularly pertains to a new and improved screw gun and tape measure device wherein the same is arranged to provide for a tape housing arranged for ease of mounting upon an associated screw gun.

2. Description of the Prior Art

In the application of fasteners directed into a drywall or plasterboard into supporting building studs, the spacing of such fasteners is enhanced in use of the instant invention by providing for the tape measure arranged for ease of mounting relative to and in cooperation with the associated screw gun and in this respect, the present invention substantially fulfills this need.

Prior art devices such as indicated in U.S. Pat. No. 4,301,596 relative to stud measuring tools and the like or U.S. Pat. No. 5,119,521 sets forth a tape measure for mounting within a hand tool handle.

SUMMARY OF THE INVENTION

In view of the foregoing disadvantages inherent in the known types of tape measuring apparatus now present in the prior art, the present invention provides a screw gun and tape measure device wherein the same is arranged for providing a tape measure housing arranged for ease of mounting upon an associated screw gun member.

To attain this, the present invention provides a screw gun typically employed in the mounting of plasterboard to building studs, including a tape housing having a central tubular opening directed coaxially thereof for mounting upon the screw gun member to permit ease of measuring among fasteners to be directed into the associated plasterboard member. The tape housing includes an extensible and retractable flexible tape member.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is another object of the present invention to provide a new and improved screw gun and tape measure device which may be easily and efficiently manufactured and marketed.

It is a further object of the present invention to provide a new and improved screw gun and tape measure device which is of a durable and reliable construction.

An even further object of the present invention is to provide a new and improved screw gun and tape measure device which is susceptible of a low cost of manufacture with regard to both materials and labor, and which accordingly is then susceptible of low prices of sale to the consuming public, thereby making such screw gun and tape measure devices economically available to the buying public.

Still yet another object of the present invention is to provide a new and improved screw gun and tape measure device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
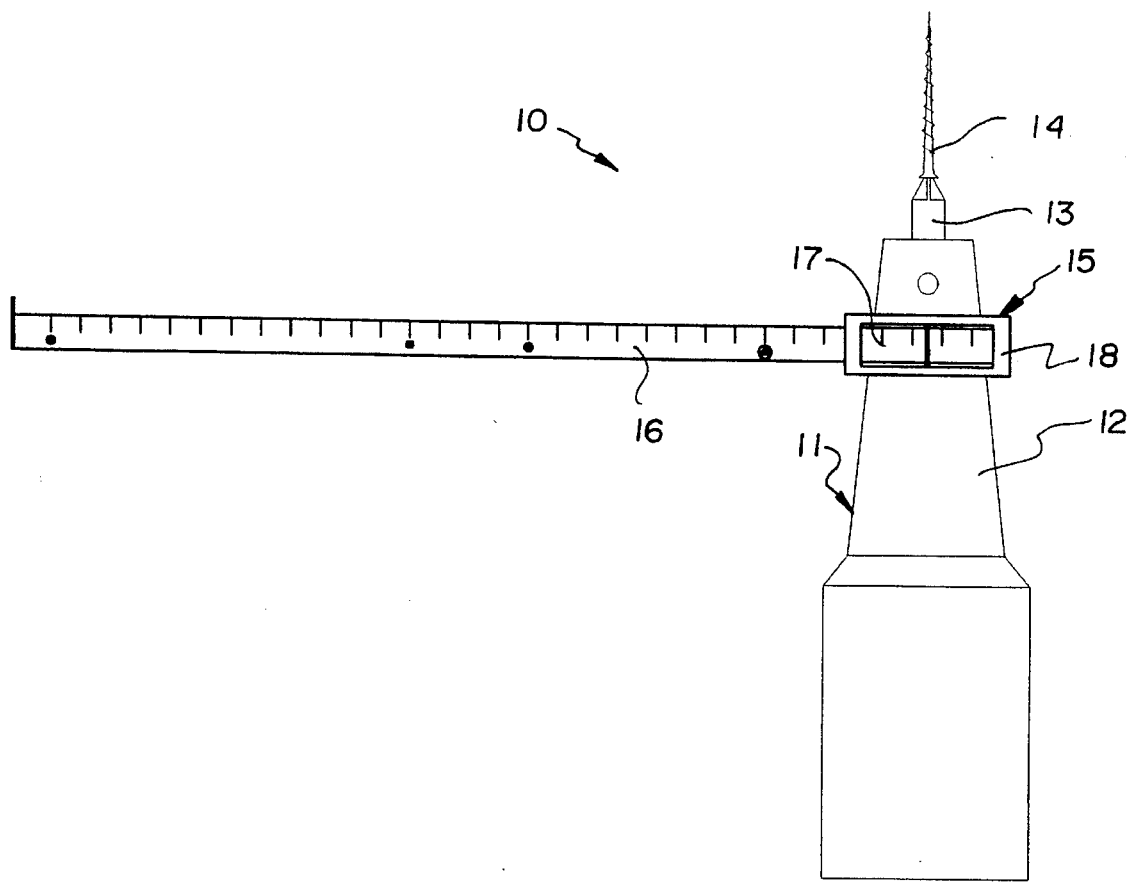
FIG. 1 is an orthographic view of the invention.
Figure 2:
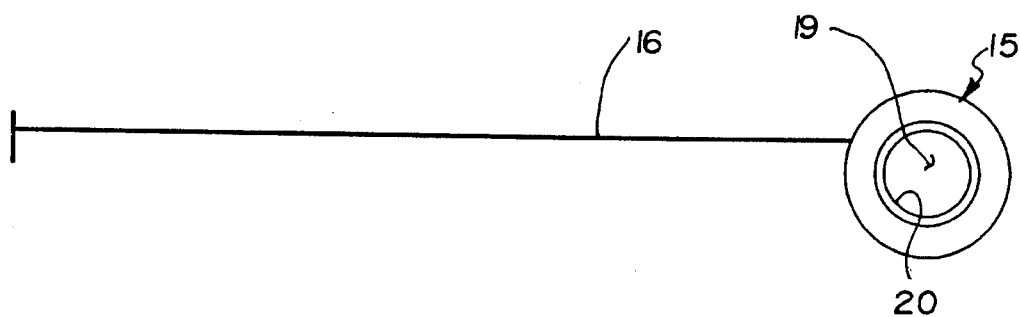
FIG. 2 is an orthographic side view of the invention.
Figure 3:
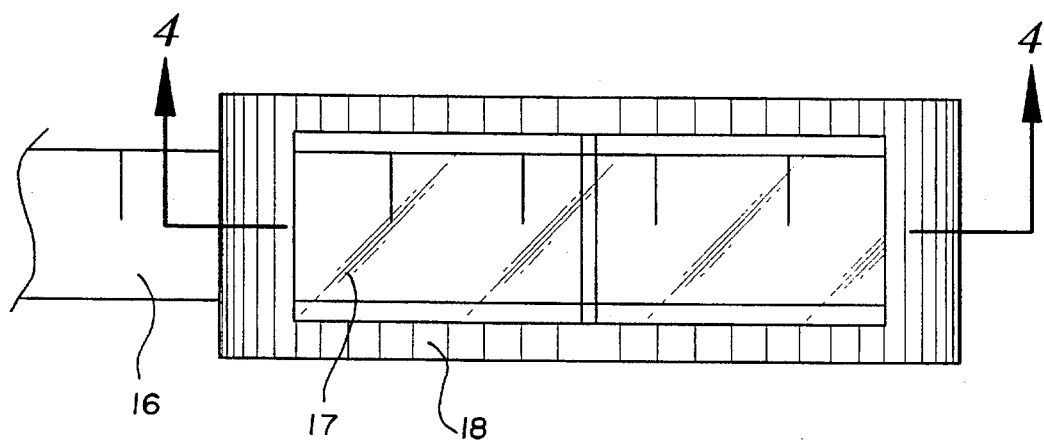
FIG. 3 is an enlarged orthographic view of the tape measure housing.
Figure 4:
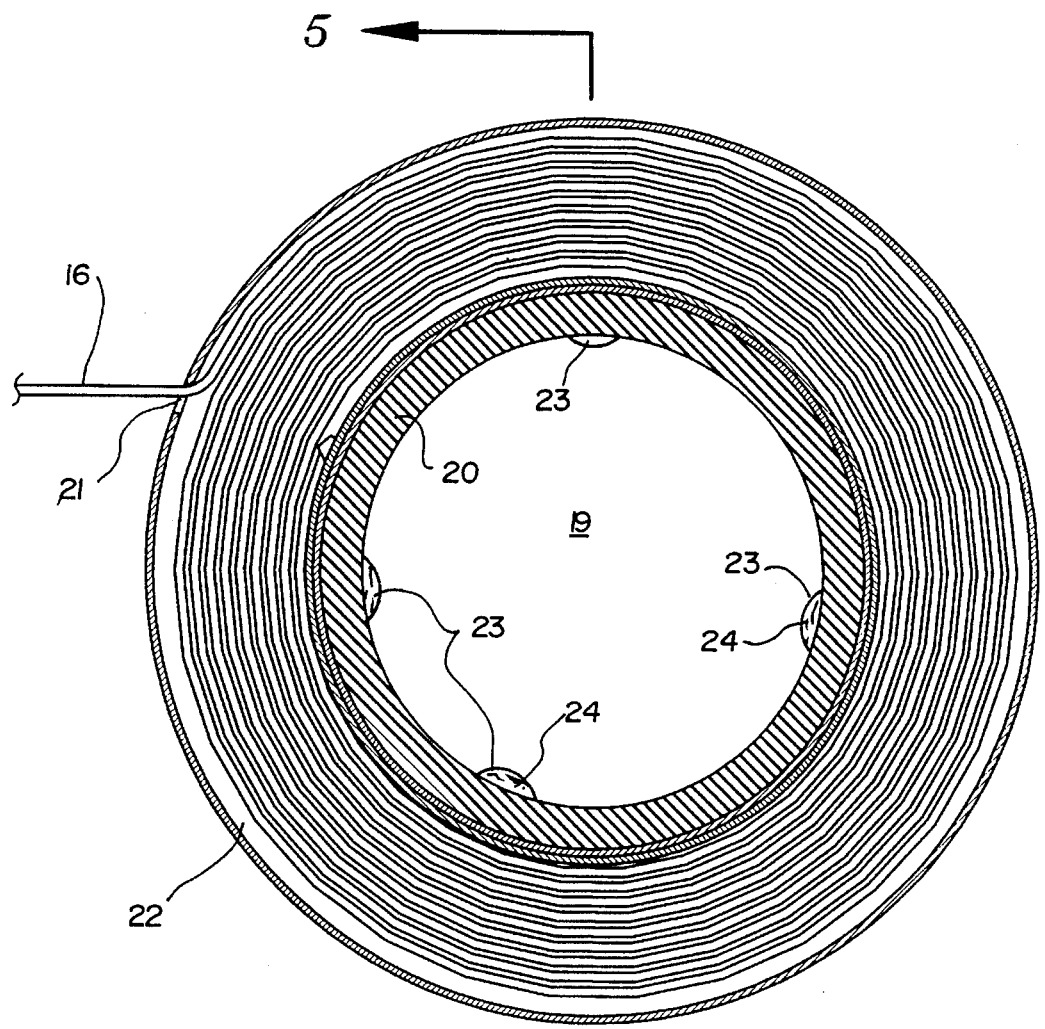
FIG. 4 is an orthographic cross-sectional illustration, taken along the lines 4—4 of FIG. 3 in the direction indicated by the arrows.

With reference now to the drawings, and in particular to FIGS. 1 to 7 thereof, a new and improved screw gun and tape measure device embodying the principles and concepts of the present invention and generally designated by the reference numeral 10 will be described.

More specifically, the screw gun and tape measure device 10 of the instant invention essentially comprises cooperation with a screw gun member having a shank 12, and including a rotary drive bit 13 to direct a screw fastener 14 into an associated drywall or plasterboard surface (not shown). A tape housing 15 is arranged for securement about the shank 12, such that spacing of screw fasteners 14 may be determined readily by use of a flexible measuring tape 16 arranged for retraction and extraction from the tape housing 15 to measure along a plaster board surface for such desired spacing of fasteners. The tape housing 15 includes a housing side wall 18 having a transparent lens 17 for ease of viewing of the measuring tape 16 and the graduations thereon. Typically, such graduations are in one inch increments but may be of any desired incremental spacing along the measuring tape 16. The tape housing 15 is arranged to include a central cylindrical opening 19, having a resilient cylindrical sleeve 20 for mounting upon the shank 12. Reference to the FIG. 4 indicates that a side wall slot 21 directed into the housing side wall 18 is arranged for ease of projection of the measuring tape 16 therefrom. It should also be noted that the measuring tape may be of a spring-biased retractable type relative to the housing 15, as such retraction structure is known in the art per se. The FIG. 4 further indicates that the resilient cylindrical sleeve 20 is formed with a plurality of frangible capsules 23 mounted in facing relationship relative to the central cylindrical opening 19, with each of the frangible capsules 23 having a fluid adhesive 24 therewithin, such that upon projection of the resilient cylindrical sleeve 20 upon the shank 12, the frangible capsules 23 are ruptured to secure the housing 15 to the shank via the fluid adhesive 24.

Figure 5:
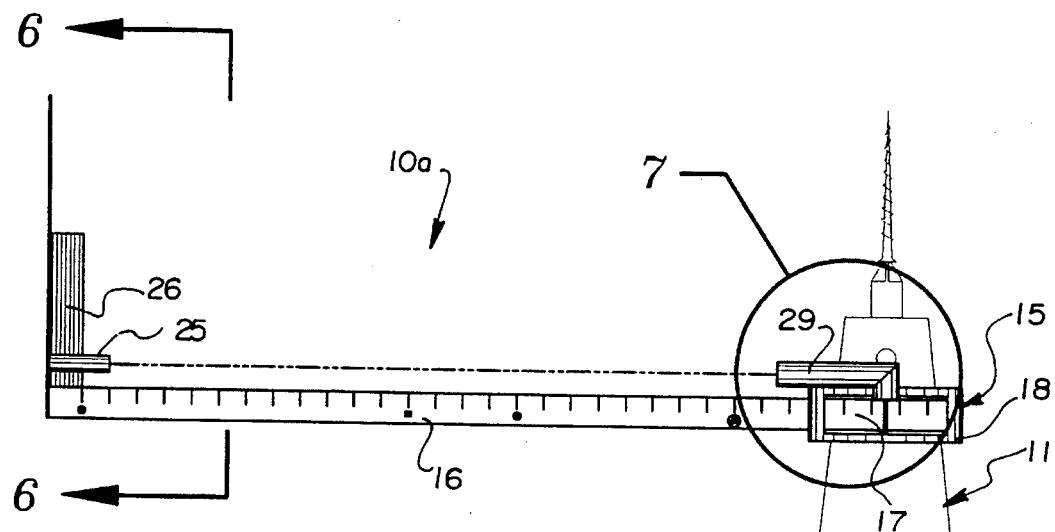
FIG. 5 is an orthographic view of a modified screw gun and tape measure device, as contemplated for use by the invention.
Figures 6, 7:
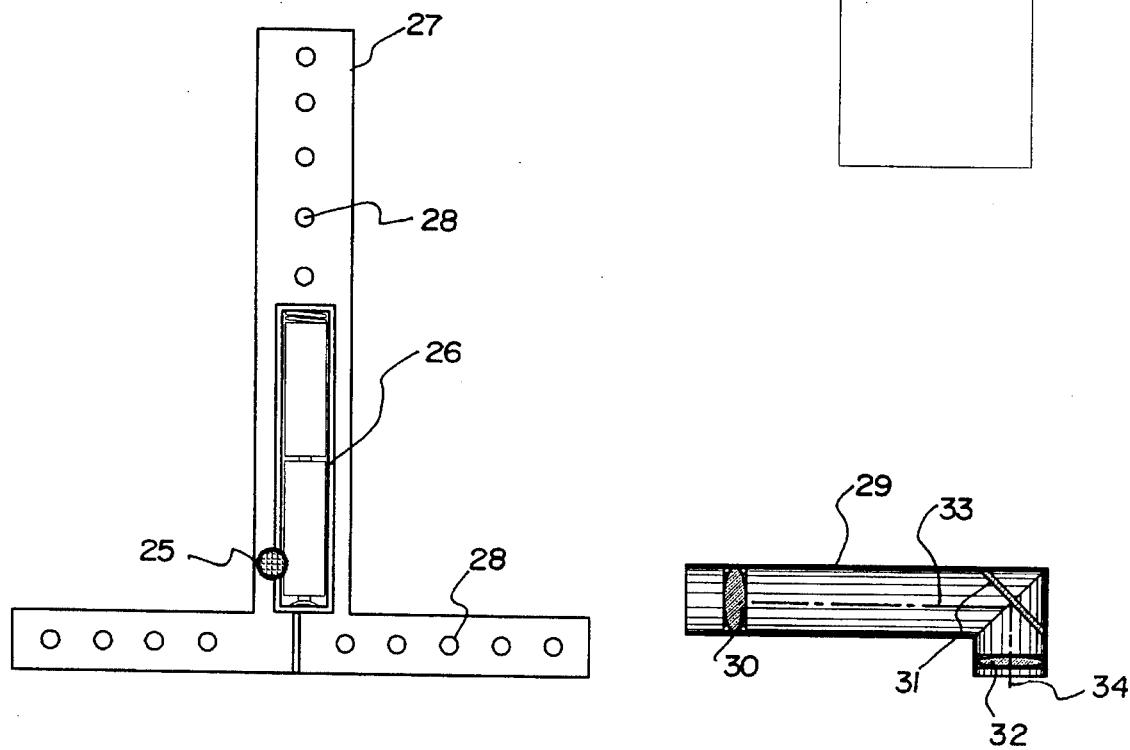
FIG. 6 is an orthographic view, taken along the lines 6—6 of FIG. 5 in the direction indicated by the arrows.
FIG. 7 is an enlarged orthographic view, partially in section, of the L-shaped light receiving tube as indicated in FIG. 5.

A tape measuring device 10a is indicated in the FIGS. 5–7 and incorporates an illumination housing 25 secured to a battery housing 26, that in turn is secured to a T-shaped mounting flange 27 having a plurality of rows of apertures 28 permitting securement of the flange 27 onto a surface for ease of measuring along a wall. An L-shaped light receiving tube 29 is mounted upon the tape housing 15 for alignment with the illumination housing 25 to receive illumination into the L-shaped light receiving tube 29. The receiving tube 29 includes a first lens 30 symmetrically oriented about a first lens axis 33, with a second lens 32 symmetrically oriented about a second lens axis 34, such that the first lens axis 33 and the second lens axis 34 are orthogonally oriented relative to one another and at their intersection is oriented a mirror 31 oriented substantially at a forty-five degree angle relative to each of the first and second lens axes 33 and 34 to direct illumination onto the lens 17 for ease of viewing of the tape 16 within the housing in adjacency to the lens 17 to indicate and visually observe the extent of the tape 16 drawn from the housing 15.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tape measure device, the device comprises, a tape housing having a cylindrical housing side wall and a cylindrical central opening, with the central opening including a resilient cylindrical sleeve, the housing side wall includes a transparent lens, and a flexible measuring tape is received through a side wall slot directed into the housing side wall for ease of removal and retraction of the flexible measuring tape relative to the housing, the resilient cylindrical sleeve includes a plurality of frangible capsules mounted onto the sleeve in facing relationship relative to the central opening, with each of the capsules having a fluid adhesive contained therewithin.

2. A device as set forth in claim 1 wherein the measuring tape includes a free distal end, and the free distal end having a T-shaped mounting flange having a plurality of rows of apertures directed therethrough, with the T-shaped mounting flange including a battery housing fixedly secured thereto, the battery housing including an illumination housing arranged for illumination, with an L-shaped light receiving tube mounted onto the tape housing, with the L-shaped light receiving tube having a first lens symmetrically oriented about a first lens axis and a second lens symmetrically oriented about a second lens axis, with the first lens axis and the second lens axis orthogonally oriented relative to one another, and a mirror oriented at an intersection of the first lens axis and the second lens axis, and oriented at forty-five degrees relative to the first lens axis and the second lens axis, with the second lens arranged in facing relationship relative to the transparent lens.

\* \* \* \* \*